(12) United States Patent
Vogel

(10) Patent No.: US 10,358,973 B2
(45) Date of Patent: Jul. 23, 2019

(54) INTERNAL COMBUSTION ENGINE

(71) Applicant: GM GLOBAL TECHNOLOGY OPERATIONS LLC, Detroit, MI (US)

(72) Inventor: Stefan Vogel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/698,247

(22) Filed: Sep. 7, 2017

(65) Prior Publication Data

US 2018/0080372 A1 Mar. 22, 2018

(30) Foreign Application Priority Data

Sep. 21, 2016 (DE) .................. 10 2016 011 392

(51) Int. Cl.
*F02D 41/22* (2006.01)
*F02B 75/04* (2006.01)
*F02B 41/04* (2006.01)
*F16C 3/06* (2006.01)
*F16C 3/28* (2006.01)

(52) U.S. Cl.
CPC ............ *F02B 75/047* (2013.01); *F02B 41/04* (2013.01); *F02B 75/048* (2013.01); *F16C 3/06* (2013.01); *F16C 3/28* (2013.01)

(58) Field of Classification Search
CPC ...... F02B 75/047; F02B 75/048; F02B 41/04; F16C 3/06

USPC ........................................................ 123/48 B
See application file for complete search history.

(56) References Cited

U.S. PATENT DOCUMENTS

| 2009/0095262 | A1* | 4/2009 | Kono ...................... | F02B 41/04 123/48 B |
| 2009/0288642 | A1* | 11/2009 | Watanabe ............... | F02B 41/04 123/48 B |
| 2009/0288643 | A1* | 11/2009 | Kono ...................... | F01M 9/06 123/48 B |
| 2010/0180868 | A1* | 7/2010 | Scalzo ................... | F02B 75/048 123/48 B |
| 2012/0210983 | A1* | 8/2012 | Naoe ...................... | F01M 11/02 123/48 B |
| 2015/0354488 | A1* | 12/2015 | Hiyoshi ................ | F02D 41/123 123/48 B |

FOREIGN PATENT DOCUMENTS

WO  2011098104 A1  8/2011

\* cited by examiner

*Primary Examiner* — Marguerite J McMahon
(74) *Attorney, Agent, or Firm* — Lorenz & Kopf, LLP

(57) ABSTRACT

An internal combustion engine includes a crankshaft and at least one piston coupled to the crankshaft for executing strokes in a cylinder as a result of rotation of the crankshaft. An eccentric shaft is coupled to the crankshaft and to the piston in such a way that strokes of the piston are adjusted by the eccentric shaft. A phase adjuster adjusts a phase of the coupling of the eccentric shaft to the crankshaft.

16 Claims, 1 Drawing Sheet

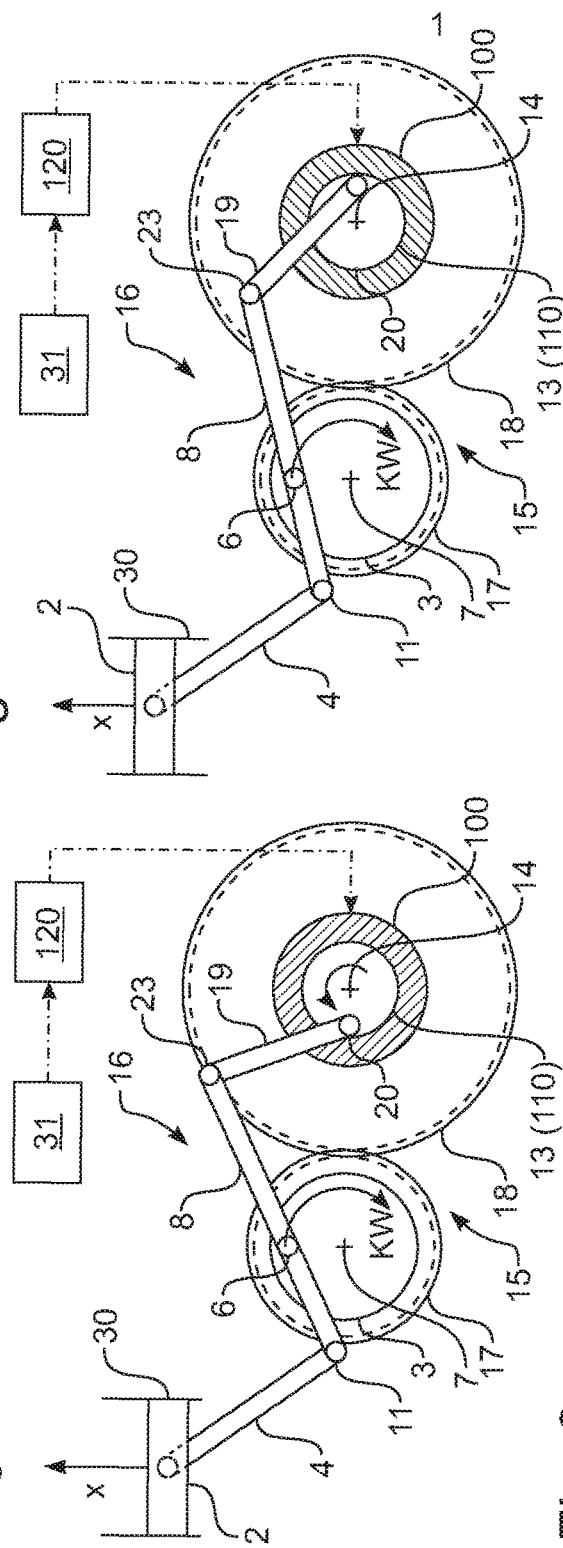

INTERNAL COMBUSTION ENGINE

CROSS-REFERENCE TO RELATED APPLICATION

This application claims priority to German Patent Application No. 102016011392.8, filed Sep. 21, 2016, which is incorporated herein by reference in its entirety.

TECHNICAL FIELD

The present disclosure relates to an internal combustion engine for a motor vehicle, a motor vehicle having the internal combustion engine and a method for operating the internal combustion engine.

BACKGROUND

DE 10 2010 004 588 A1 discloses an internal combustion engine having a crankshaft and an eccentric shaft which is connected to the crankshaft by connecting rods and coupling members for the extension of an expansion stroke of the piston of the internal combustion engine. The eccentric shaft is driven by the crankshaft via a spur gearing at half the rotational speed of the crankshaft in order to increase the expansion and exhaust stroke, i.e., the piston stroke during the expansion and exhaust cycle, with respect to the intake and compression stroke, i.e., the piston stroke during the intake and compression cycle.

SUMMARY

According to an embodiment of the present disclosure, an internal combustion engine for a motor vehicle includes a crankshaft and at least one piston which are coupled to the crankshaft and reciprocating in a cylinder and corresponding to rotation of the crankshaft. An eccentric shaft is coupled to the crankshaft and to the piston in such a way that strokes of this piston can be adjusted, at least temporarily or in at least one operating state, through the eccentric shaft. In one embodiment, rotation of the crankshaft in the cylinder corresponds to the piston executing successive cycles from an intake (downward) stroke, a subsequent compression (upwards) stroke, a subsequent expansion (downwards) stroke, and a subsequent discharge or exhaust (upwards) stroke. In the present case, an adjustment of a stroke is intended to mean a change of a stroke path between an upper and a lower end point, which define or limit the stroke path.

According to an embodiment of the present disclosure, a phase of the coupling of the eccentric shaft with the crankshaft or the coupling between the eccentric shaft and the crankshaft is adjusted by a phase adjuster. According to an embodiment of the present disclosure, the internal combustion engine has a phase adjuster with which a phase of the coupling of the eccentric shaft with the crankshaft or the coupling between the eccentric shaft and the crankshaft can be adjusted, in particular, is adjusted or set up or used for this purpose.

In this way, an additional control degree of freedom can be made available or used. In particular, the additional control degree of freedom may be a ratio of successive strokes within or between the individual cycles to each other or among each other, for example a ratio between a compression and a subsequent expansion stroke and thus a ratio between a compression ratio and an expansion ratio of the cylinder, is advantageously varied according to an operating state of the internal combustion engine. As such, an operating behavior of the internal combustion engine may be improved.

In one embodiment, the eccentric shaft is coupled to the crankshaft and the piston in such a way that strokes of a cycle determined by it can be extended relative to other strokes of the cycle, in particular steplessly or continuously and/or depending on the position of the phase adjuster. In particular expansion strokes relative to compression and/or discharge strokes can be increased depending on the position of the phase adjuster relative to compression or discharge strokes.

In one embodiment, the eccentric shaft, in addition to the coupling to the one or more pistons of the internal combustion engine via the crankshaft, is mechanically coupled with the crankshaft in such a way that it can be operated at a certain rotary speed ratio with half the rotary speed of the crankshaft, and/or rotates with a phase adjustable by the phase adjuster with respect to the crankshaft. A phase is dependent on a distance between reaching a predetermined, reference position or angle of the crankshaft and reaching subsequent or preceding of a predetermined, reference position or angle of the eccentric shaft. In one embodiment, the crankshaft and the eccentric shaft are rotatably mounted about axes of rotation offset parallel to one another, in particular in a single-part or multi-part housing of the internal combustion engine.

In an embodiment, the internal combustion engine has at least one additional piston, which is coupled to the crankshaft for executing strokes in another cylinder corresponding to rotation of the crankshaft in the other cylinder, in particular successive cycles from an intake (downwards) stroke, a subsequent compression (upwards) stroke, a subsequent expansion (downwards) stroke, and a subsequent exhaust or discharge (upwards) stroke.

In one embodiment, the eccentric shaft is coupled to the crankshaft with an adjustable phase with the crankshaft and/or via the crankshaft, to the additional piston, that by it certain strokes of a cycle can be adjusted relative to other strokes of the cycle, in particular expansion strokes relative to compression and/or discharge strokes. The adjustment may be selective or depend on the position of the phase adjuster relative to compression or discharge strokes.

As a result, in an embodiment for a plurality of cylinders a ratio of successive, strokes within or between the individual cycles, for example a ratio between a compression and a subsequent expansion stroke, and thus a ratio between a compression and an expansion ratio of the respective cylinder, can be advantageously varied according to an operating state of the internal combustion engine, and thereby an operating behavior of the internal combustion engine can be further improved in one embodiment.

In one embodiment, the crankshaft, the eccentric shaft and the at least one piston, in addition to the phase-adjustable coupling of the eccentric shaft to the crankshaft, are coupled by a crank drive, such as a multi-articular crank drive. In a further development, the crankshaft, the eccentric shaft and the at least one further piston are coupled by a further crank drive. In one embodiment, the eccentric shaft and/or the at least one piston is/are each coupled by a connecting rod to a coupling member of the crank drive. The coupling member is coupled collectively to the crankshaft. In a further embodiment, the eccentric shaft and/or the at least one further piston are/is each coupled by a connecting rod to a further coupling member, such as the further crank drive, which is coupled to the crankshaft. As a result, the mechanical coupling can be improved in one embodiment, in particular, can be realized compactly, reliably and/or precisely.

In one embodiment, the eccentric shaft, in a position of the phase adjuster, extends the expansion and/or discharge strokes of the at least one piston with respect to the intake and/or compression strokes of this piston by an amount and, in at least one further position of the phase adjuster, expansion and/or discharge strokes of this piston with respect to intake and/or compression strokes of this piston by a different amount greater than the one amount, in particular in a first position of the phase adjuster, expansion and/or discharge strokes of the at least one piston with respect to intake and/or compression strokes of this piston by a first amount and in a second position of the phase adjuster, expansion and/or discharge strokes of this piston with respect to intake and/or compression strokes of this piston by a second amount greater than the first amount, or is set up for this purpose or is used for this purpose.

In a further development, the eccentric shaft, in the one position of the phase adjuster, also extends expansion and/or discharge strokes of the at least one further piston with respect to the intake and/or compression strokes of this piston by this one amount, and in the at least one further position of the phase adjuster, also the expansion and/or discharge strokes of this piston with respect to this intake and/or compression strokes of this piston by another, in particular this one other, amount, which is larger than this one amount, in particular in the first position of the phase adjuster, expansion and/or discharge strokes of the at least one further piston with respect to intake and/or compression strokes of this piston by the same or another first amount and in a second position of the phase adjuster, expansion and/or discharge strokes of this piston with respect to intake and/or compression strokes of this piston by the same or another second amount greater than this first amount, or is set up for this purpose or is used for this purpose.

In the present case, an expansion stroke is understood in the conventional manner, to be a stroke in an expansion cycle(s) of the internal combustion engine, or a combustion-driven volume-increasing movement of the piston in the cylinder. An exhaust or discharge stroke is understood to be in an opposite direction to the expansion stroke in particular subsequent, discharge cycle(s) of the internal combustion engine or a volume-reducing movement of the piston in the cylinder for discharging exhaust gas. An intake stroke is understood to be in an opposite direction to the discharge stroke in a subsequent, intake cycles(s) of the internal combustion engine or a volume-increasing movement of the piston in the cylinder to draw in combustion air or a combustion air-fuel mixture. A compression stroke is understood to be in a direction opposite to the intake stroke in subsequent, compression cycle(s) of the internal combustion engine or a volume-reducing movement of the piston in the cylinder to compress combustion air or a combustion air mixture.

By a variable extension of expansion and/or discharge strokes with respect to intake and/or compression strokes, a variable Atkinson cycle can be realized in one embodiment and as a result in a further development, exhaust gas can have less pressure and/or be cooled and thus the energy contained in the gas can be better utilized and/or the cylinder can be better flushed and thus an operating behavior of the internal combustion engine can be further improved.

In addition, or alternatively, in one embodiment, the eccentric shaft, in a position of the phase adjuster, extends compression and/or expansion strokes of the at least one piston with respect to intake and/or discharge strokes of this piston by an amount and in at least one further position of the phase adjuster, compression and/or expansion strokes of this piston with respect to intake and/or discharge strokes of this piston by another amount which is greater than the one amount, in particular in a further first position of the phase adjuster, compression and/or expansion strokes of the at least one piston with respect to intake and/or discharge strokes of this piston by a first amount and in a further second position of the phase adjuster, compression and/or expansion strokes of this piston with respect to intake and/or discharge strokes of this piston by a second amount which is greater than this first amount, or is set up for this purpose or is used for this purpose.

In a further development, the eccentric shaft in this one position of the phase adjuster (also) extends compression and/or expansion strokes of the at least one further piston with respect to the intake and/or discharge strokes of this piston by an amount and in this at least one further position of the phase adjuster, compression and/or expansion strokes of this piston with respect to intake and/or discharge strokes of this piston by another amount, which is greater than this one amount in the further first position of the phase adjuster, compression and/or expansion strokes of the at least one further piston with respect to intake and/or discharge strokes of this piston by the same or another first amount, and in the further second position of the phase adjuster, compression and/or expansion strokes of the at least one further piston with respect to intake and/or discharge strokes of this piston by the same or another second amount, which is greater that this first amount, or is set up for this purpose or is used for this purpose.

By a variable extension of compression and/or expansion strokes with respect to intake and/or discharge strokes, a variable inverted Atkinson cycle can be realized in one embodiment and as a result, combustion air or combustion air mixture can be compressed more intensively in a further development and thus an operating behavior of the Internal combustion engine can be further improved if a turbocharger, still provides no or low charge pressure. In one embodiment, a starting process, efficiency at lower loads or in partial load ranges, a power density and/or an unsteady response behavior of the internal combustion engine can be improved by a variable inverted Atkinson cycle.

In addition, or alternatively, in one embodiment, the eccentric shaft extends expansion and/or discharge strokes of the at least one piston with respect to compression and/or expansion strokes of this piston, in a position of the phase adjuster. In at least one further position of the phase adjuster, compression and/or expansion strokes of this piston with respect to intake and/or discharge strokes of this piston in the first position of the phase adjuster, expansion and/or discharge strokes of the at least one piston with respect to intake and/or compression strokes of this piston, and in a further first position of the phase adjuster, compression and/or expansion strokes of this piston with respect to intake and/or discharge strokes of this piston, or is set up for this purpose or is used for this purpose.

In a further development, the eccentric shaft, in the one position of the phase adjuster, also extends expansion and/or discharge strokes of the at least one additional piston with respect to intake and/or compression strokes of this piston, and in the at least one further position of the phase adjuster, compression and/or expansion strokes of this piston with respect to intake and/or discharge strokes of this further piston in the first position of the phase adjuster, expansion and/or discharge strokes of the at least one further piston with respect to intake and/or compression strokes of this piston, and in the further first position of the phase adjusters, compression and/or expansion strokes of this piston with respect to intake and/or discharge strokes of this piston, or is set up for this purpose or is used for this purpose.

As a result, in an embodiment, an Atkinson cycle and an inverted Atkinson cycle can be selectively switched, and thus an operating behavior of the internal combustion engine can be further improved.

In addition or alternatively in an embodiment, the eccentric shaft, reduces a deviation between expansion, discharge, intake and compression strokes in a neutral position of the phase adjuster to at most 50%, preferably at most 10%, and in particular at most 1%, of a maximum possible or adjustable deviation, in particular—at least substantially or within the scope of a positioning accuracy—to zero, or is set up for this purpose or is used for this purpose.

In this way, in an embodiment, an inverted Atkinson cycle or an Otto cycle or a diesel cycle can be selectively executed or carried out without stroke extensions, in a further development, as a function of one or more operating parameters of the internal combustion engine for an operating state such as a load range, a rotational speed, a torque, a temperature and/or a charge pressure of a turbocharger. In this way, an operating behavior of the internal combustion engine can be further improved in one embodiment.

In an embodiment, the internal combustion engine has a transmission which mechanically couples the eccentric shaft to the crankshaft in addition to the coupling(s) to the piston via the crankshaft and in addition to the crank drive(s) in such a way that the eccentric shaft rotates with respect to the crankshaft with half the rotational speed of the crankshaft, and/or rotates with a phase which can be adjusted by the phase adjuster with respect to this is driven by this, or is set up for this purpose or is used for this purpose.

In a further development, the transmission has a first and a second transmission element, the phase offset of which can be adjusted or is adjusted with respect to the first transmission element by the phase adjuster for adjusting the phase of the coupling of the eccentric shaft to the crankshaft, or is set up for this or is used for this. A phase offset is dependent on a distance between reaching a predetermined, reference position or angle of the first transmission element and reaching a subsequent or preceding predetermined, reference position or angle of the second transmission element. As a result, the mechanical coupling and/or its phase adjustment can be improved, in particular realized compactly, reliably and/or precisely.

In a further development, the transmission may include a toothed transmission wheel and/or a frictionally and/or positive-locking, traction transmission, such as a thrust or traction chain and/or belt transmission. As a result, the mechanical coupling can be improved in one embodiment, in particular, can be realized compactly, reliably and/or precisely.

In one embodiment, the phase adjuster operates hydraulically and/or electrically, in particular electromagnetically and/or by motor, and/or is actuated and/or controlled hydraulically and/or electrically, in particular electromagnetically and/or by motor, or is a hydraulic and/or electrical phase adjuster. As a result, the mechanical coupling can be improved in one embodiment, in particular, can be realized compactly, reliably and/or precisely.

In an embodiment, the internal combustion engine has at least one turbocharger for pressure-charged filling of the at least one cylinder. In particular, in the case of pressure-charged internal combustion engines, an inverted Atkinson cycle can advantageously increase the pressure of the combustion air or of the combustion air mixture in phases of a lacking or low pressure supercharging, and thus improve the operation of the internal combustion engine.

In one embodiment, the phase of the coupling of the eccentric shaft with the crankshaft by the phase adjuster is adjusted as a function of one or more operating parameters of the internal combustion engine for an operating state such as a load range, a rotational speed, a torque, a temperature and/or a charge pressure of at least one turbocharger, or the phase adjuster is correspondingly controlled. Correspondingly, the internal combustion engine has, in one embodiment, a controller which is set up or is used for hardware and/or software purposes, for this purpose, or for controlling the phase adjuster to adjust the phase of the coupling of the eccentric shaft to the crankshaft as a function of one or more operating parameters of the internal combustion engine for an operating state such as a load range, a rotational speed, a torque, a temperature and/or at least one turbocharger. As a result, in one embodiment, a ratio of the strokes can be advantageously varied, correspondingly to an operating state of the internal combustion engine, and thereby, in one embodiment, an operating behavior of the internal combustion engine can be further improved.

A controller in accordance with the present disclosure can be configured as hardware- and/or software-engineering, in particular a data processing or signal-connected, in particular a digital, processing, in particular microprocessor unit (CPU), in particular having a storage and/or bus system, and/or have one or more programs or program modules. The CPU may be configured to process commands that are implemented as a program stored in a storage system, to acquire input signals from a data bus, and/or to communicate output signals to a data bus. A storage system can have one or more different, storage media, such as optical, magnetic, solid-state and/or other non-volatile media. The program can be designed in such a way that it is able to execute and embody the methods described here, so that the CPU can execute the steps of such methods and can operate for controlling the internal combustion engine, particularly the phase adjuster. In one embodiment, one or more, and preferably all, steps of the method are carried out by the controller.

BRIEF DESCRIPTION OF THE DRAWINGS

The present disclosure will hereinafter be described in conjunction with the following drawing figures, wherein like numerals denote like elements.

FIG. 1 shows a part of an internal combustion engine according to an embodiment of the present disclosure with a phase adjuster in a first position;

FIG. 2 shows the internal combustion engine with the phase adjuster in a further first position;

FIG. 3 shows strokes of a piston of the internal combustion engine at the first position and the further first position of the phase adjuster; and FIG. 4 is a flow diagram showing a method of operating the internal combustion engine according to an embodiment of the present disclosure.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

FIG. 1 shows a part of an internal combustion engine according to an embodiment of the present disclosure. The internal combustion engine has a crankshaft 3 rotatably mounted about an axis of rotation 7, a plurality of pistons, for example four, six, eight, ten or twelve pistons (of which only one piston 2 is shown by way of example in FIG. 1 for a better overview) and an eccentric shaft 13 rotatably mounted about an axis of rotation 14. The rotational axes 7, 14 are offset parallel to each other. The pistons are structurally and functionally identical, so that only the exemplarily illustrated piston 2 is explained below, and reference may be made to additional pistons not otherwise shown. Express reference is also made to DE 10 2010 004 588 A1 and the contents thereof, which are expressly incorporated by reference herein and reference symbols of which are partly adopted for this purpose.

The eccentric shaft 13 is coupled via a gear transmission 15 which has a gear wheel 17 which is torque-proof with the crankshaft 3 and a gear wheel 18 cogging with it having a double number of teeth, which is coupled to an output 110 of the gearwheel transmission 15 which is torque-proof with the eccentric shaft 13, via a phase adjuster 100, by which a phase of the coupling of the eccentric shaft 13 to the crankshaft 3 can be adjusted or adjusted in the manner known per se, for example by camshaft adjusters.

The piston 2 is coupled to the crankshaft 3 for executing strokes in a cylinder 30 as a result of rotation of the crankshaft 3 by a crank drive 16 through which certain strokes can be extended within a cycle of intake, compression, expansion, and discharge strokes. For this purpose, the crank drive 16 has a common coupling member 8 which is mounted on the crankshaft 3 in a stroke pivot joint 6 which is eccentric to the axis of rotation 7 and is coupled to the piston 2 by a piston connecting rod 4 mounted on the coupling member 8 in a swivel joint 11. An articulated connecting rod 19 is connected to the eccentric shaft 13 in a pivotal joint 20 eccentric to the axis of rotation 14 and to the coupling member 8 in a swivel joint 23.

An engine electronic control unit or ECU or simply controller 120 receives data from, among other things, a turbocharger 31 for pressure-charged filling of the cylinders 30, and controls the phase adjuster 100 as indicated by dashed-dotted signal arrows in FIG. 1.

In a first position S10 of the phase adjuster 100 (see FIG. 4), indicated in FIG. 1, the eccentric shaft 13 extends expansion strokes in expansion cycles E and discharge strokes in discharge cycles A with respect to intake strokes in intake cycles S and compression strokes in compression cycles K as shown in FIG. 3 in which the movement x of the piston 2 is indicated above the crankshaft angle KW of the crankshaft 3, and thus realizes an Atkinson cycle.

As a function of at least one operating parameter of the internal combustion engine, for example, if a charging pressure of the turbocharger 31 falls below a predefined limit amount, the ECU 120 controls the phase adjuster 100 into a further first position S100 (see FIG. 4), which is indicated in FIG. 2. In this further first position of the phase adjuster 100, the eccentric shaft 13 now extends the expansion strokes in the expansion cycles E and the compression strokes in the compression cycles K with respect to the intake strokes in the intake cycles S and the discharge strokes in the discharge cycles A as indicated in dashed lines in FIG. 3 and thus realizes an inverted Atkinson cycle.

As a function of the at least one operating parameter of the internal combustion engine, the ECU 120 again controls the phase adjuster 100 into a first position S10 (see FIG. 4).

In addition or alternatively, the ECU 120, controls the phase adjuster 100 coming from the first position S10 shown in FIG. 1 into a second position S20 (see FIG. 4) as a function of at least one operating parameter, for example a load range, of the internal combustion engine. In which the eccentric shaft 13 extends the expansion and discharge strokes with respect to the intake and compression strokes by a larger amount.

In addition or alternatively, the ECU 120, controls the phase adjuster 100 coming from the further first position S100 shown in FIG. 2 into a further second position S200 (see FIG. 4) as a function of at least one operating parameter, for example the load range, of the internal combustion engine. In which the eccentric shaft 13 extends the compression and expansion strokes with respect to the intake and discharge strokes by a larger amount.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An internal combustion engine for a motor vehicle comprises:
   a crankshaft;
   a first piston coupled to the crankshaft for executing strokes in a first cylinder corresponding to rotation of the crankshaft;
   an eccentric shaft coupled to the crankshaft and to the first piston such that the strokes of the first piston are adjustable; and
   a phase adjuster for adjusting a phase of the coupling of the eccentric shaft to the crankshaft;
   wherein the eccentric shaft, in a first position of the phase adjuster, extends at least one of an expansion stroke or a discharge stroke with respect to at least one of an intake or a compression stroke by a first amount, and in a second further position of the phase adjuster, extends at least one of the expansion stroke or the discharge stroke with respect to at least one of the intake stroke or compression stroke by a second amount which is greater than the first amount.

2. The internal combustion engine according to claim 1, further comprising a second piston coupled to the crankshaft for executing strokes in a second cylinder corresponding to rotation of the crankshaft, wherein the eccentric shaft is coupled to the crankshaft and to the second piston such that the strokes of the second piston are adjustable.

3. The internal combustion engine according to claim 1, further comprising a crank drive coupling the crankshaft, the eccentric shaft and the first piston.

4. The internal combustion engine according to claim 3, further comprising a connecting rod coupling the piston and the crankshaft, wherein the eccentric shaft and the connecting rod are coupled with a coupling member.

5. The internal combustion engine according to claim 1, further comprising a transmission coupling the eccentric shaft to the crankshaft.

6. The internal combustion engine according to claim 5 wherein the transmission comprises a first transmission element and a second transmission element, wherein a phase offset is adjustable by the phase adjuster for adjusting the phase of the coupling of the eccentric shaft to the crankshaft with respect to the first transmission element.

7. The internal combustion engine according to claim 6 wherein at least one of the first and second transmission elements comprises one of a toothed gear, frictionally-locking traction element or positive-locking traction transmission.

8. The internal combustion engine according to claim 1, wherein the eccentric shaft, in a third position of the phase adjuster, extends at least one of the expansion stroke or the discharge stroke with respect to at least one of the intake stroke or the compression stroke by a third amount, and in a fourth position of the phase adjuster, extends at least one of the expansion stroke or the discharge stroke with respect to at least one of the intake stroke or the compression stroke by another amount which is greater than the first amount.

9. The internal combustion engine as claimed in claim 1, wherein the eccentric shaft, in a first position of the phase adjuster, extends at least one of an expansion stroke or a discharge stroke with respect to at least one of an intake or a compression stroke by a first amount, and in a second further position of the phase adjuster, reduces a deviation between expansion, discharge, intake and compression strokes to at most 50%.

10. The internal combustion engine according to claim 1, wherein the phase adjuster comprises one of a hydraulic phase adjuster or an electrical phase adjuster.

11. The internal combustion engine according to claim 1, further comprising at least one turbocharger for pressure-charged filling of the first cylinder.

12. The internal combustion engine according to claim 1, further comprising a controller for controlling the phase adjuster to adjust the phase of the coupling of the eccentric shaft to the crankshaft as a function of at least one operating parameter for an operating state.

13. The internal combustion engine according to claim 12, wherein the at least one operating parameter is selected from the group consisting of a load range, a rotational speed, a torque, a temperature, a load pressure of at least one turbocharger or a combination thereof.

14. A method for operating an internal combustion engine having a crankshaft, a piston coupled to the crankshaft for executing strokes in a cylinder corresponding to rotation of the crankshaft, an eccentric shaft coupled to the crankshaft and to the piston, and a phase adjuster for adjusting a phase of the coupling of the eccentric shaft to the crankshaft, the method comprising adjusting a phase between the eccentric shaft and the crankshaft with the phase adjuster to extend at least one of an expansion stroke or a discharge stroke with respect to at least one of an intake or a compression stroke by a first amount, and further adjusting a phase between the eccentric shaft and the crankshaft with the phase adjuster to extend at least one of an expansion stroke or a discharge stroke with respect to at least one of an intake or a compression stroke by a second amount greater than the first amount.

15. The method according to claim 14, further comprising controlling the phase adjuster to adjust the phase between the eccentric shaft and the crankshaft as a function of at least one operating parameter for an operating state of the internal combustion engine.

16. The method according to claim 15, wherein the at least one operating parameter is selected from the group consisting of a load range, a rotational speed, a torque, a temperature, a load pressure of at least one turbocharger or a combination thereof.

* * * * *